United States Patent
Kim et al.

(10) Patent No.: US 9,207,902 B2
(45) Date of Patent: Dec. 8, 2015

(54) METHOD AND APPARATUS FOR IMPLEMENTING MULTI-VISION SYSTEM BY USING MULTIPLE PORTABLE TERMINALS

(71) Applicant: SAMSUNG ELECTRONICS CO., LTD., Suwon-si (KR)

(72) Inventors: Dong-hyun Kim, Suwon-si (KR); Je-han Yoon, Seongnam-si (KR); Young-ri Kim, Suwon-si (KR); Sang-ok Cha, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 140 days.

(21) Appl. No.: 13/735,664

(22) Filed: Jan. 7, 2013

(65) Prior Publication Data

US 2013/0176255 A1    Jul. 11, 2013

(30) Foreign Application Priority Data

Jan. 6, 2012 (KR) .................. 10-2012-0002036

(51) Int. Cl.
*G06F 3/14* (2006.01)
*G06F 3/01* (2006.01)
*G06F 3/0488* (2013.01)

(52) U.S. Cl.
CPC ................ *G06F 3/1423* (2013.01); *G06F 3/01* (2013.01); *G06F 3/04883* (2013.01); *G06F 3/1446* (2013.01); *G09G 2300/026* (2013.01); *G09G 2356/00* (2013.01)

(58) Field of Classification Search
None
See application file for complete search history.

(56) References Cited

U.S. PATENT DOCUMENTS

| 9,047,042 B2 * | 6/2015 | Sharma et al. ..................... 1/1 |
| 2004/0172870 A1 | 9/2004 | Buring et al. |
| 2008/0216125 A1 * | 9/2008 | Li et al. ........................... 725/62 |
| 2010/0293502 A1 | 11/2010 | Kang et al. |

(Continued)

FOREIGN PATENT DOCUMENTS

| KR | 1020040018062 A | 3/2004 |
| KR | 100969249 B1 | 7/2010 |

OTHER PUBLICATIONS

Borovy, Ph.D., Rick and Brian Knep. Junkyard Jumbotron. MIT's Center for Future Civic Media (1 page total . <http://jumbotron.media.mit.edu/>.

(Continued)

*Primary Examiner* — Joseph Haley
*Assistant Examiner* — Emily Frank
(74) *Attorney, Agent, or Firm* — Sughrue Mion, PLLC

(57) ABSTRACT

A method for implementing a multi-vision system by using a plurality of portable terminals, wherein, if a user applies a touch input to each of the plurality of portable terminals in a state in which the plurality of portable terminals are disposed, each of the plurality of portable terminals transmits information relating to the touch input to a multi-vision controller, and the multi-vision controller determines how the plurality of portable terminals have been disposed by using the touch input information and then transmits picture division information indicating a respective content portion to be displayed by each portable terminal to the plurality of portable terminals, and thus, the user can conveniently and quickly implement the multi-vision system by using the plurality of portable terminals and can select an optimized disposition of the plurality of portable terminals based on the characteristics of the content.

24 Claims, 13 Drawing Sheets

(56) References Cited

U.S. PATENT DOCUMENTS

| | | | |
|---|---|---|---|
| 2011/0109526 A1* | 5/2011 | Bauza et al. | 345/1.3 |
| 2011/0209104 A1* | 8/2011 | Hinckley et al. | 715/863 |
| 2011/0216064 A1* | 9/2011 | Dahl et al. | 345/428 |
| 2012/0062442 A1* | 3/2012 | Locker et al. | 345/1.3 |

OTHER PUBLICATIONS

International Search Report, dated May 1, 2013, issued by the International Searching Authority in counterpart International Application No. PCT/KR2013/000096.

Written Opinion, dated May 1, 2013, issued by the International Searching Authority in counterpart International Application No. PCT/KR2013/000096.

* cited by examiner

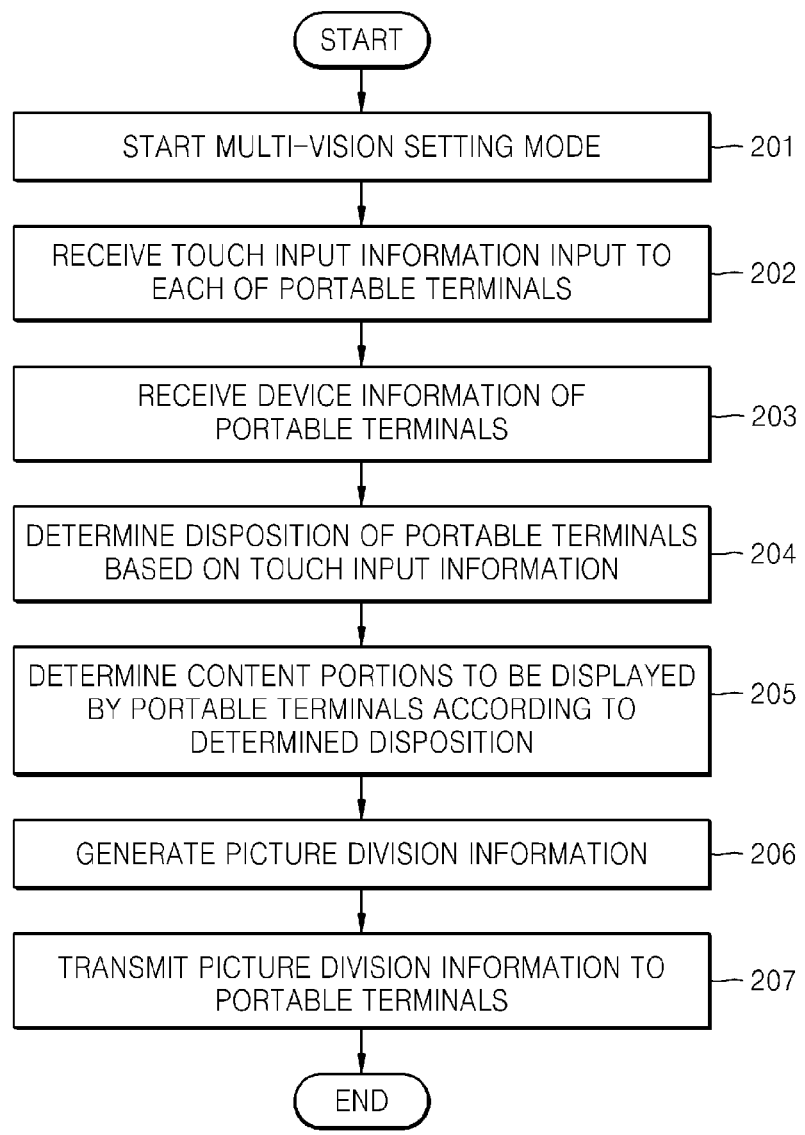

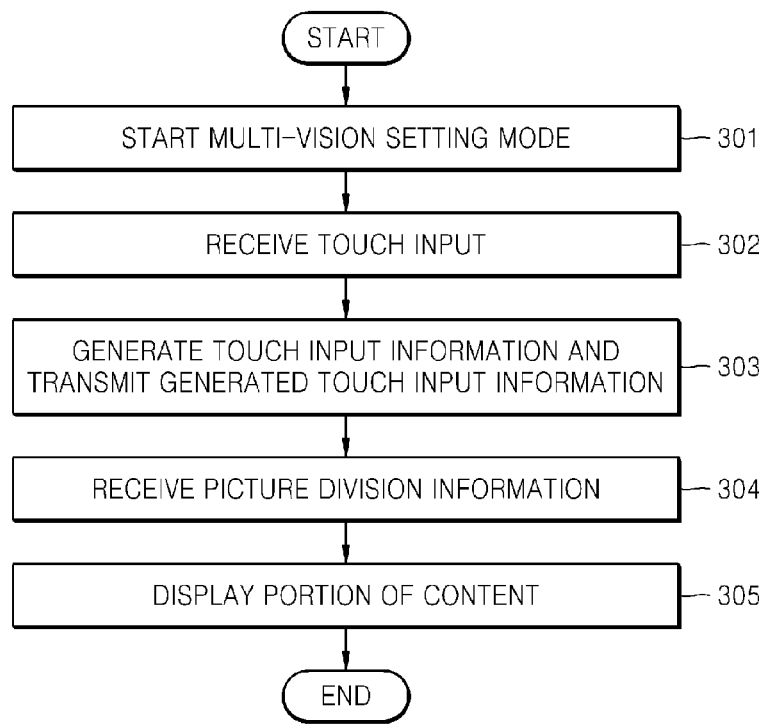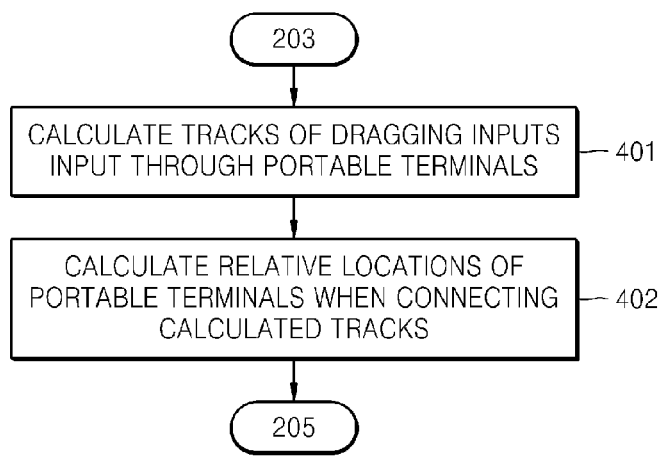

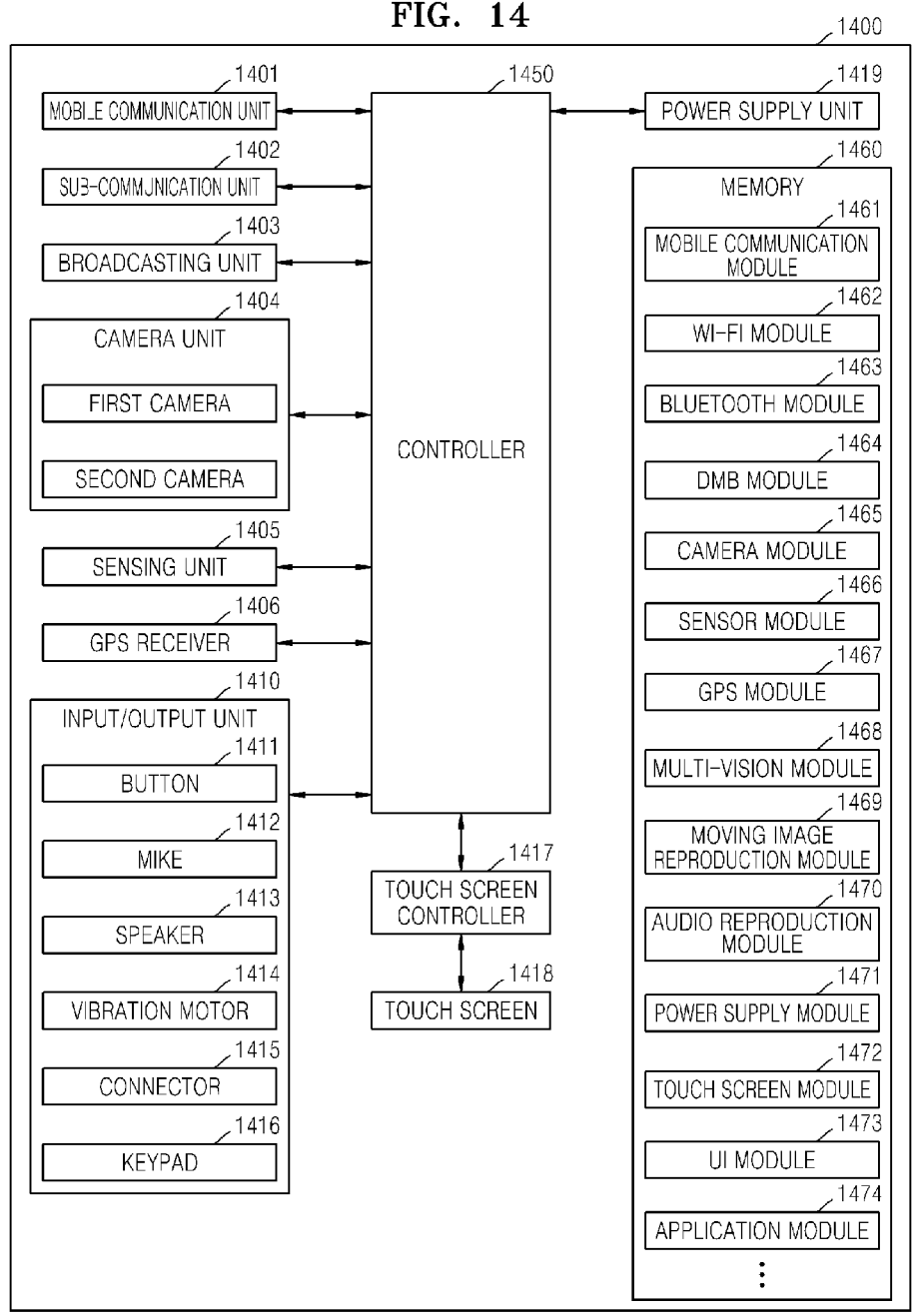

METHOD AND APPARATUS FOR IMPLEMENTING MULTI-VISION SYSTEM BY USING MULTIPLE PORTABLE TERMINALS

CROSS-REFERENCE TO RELATED PATENT APPLICATION

This application claims priority from Korean Patent Application No. 10-2012-0002036, filed on Jan. 6, 2012, in the Korean Intellectual Property Office, the disclosure of which is incorporated herein by reference in its entirety.

BACKGROUND

1. Field

Exemplary embodiments relate to a method and apparatus for implementing a multi-vision system by controlling a plurality of portable terminals.

2. Description of the Related Art

The term "multi-vision" refers to a method for displaying a single item of content by using a plurality of independent display devices. Since a single display device technically has a limited size, a multi-vision system which includes a plurality of display devices is mainly used when it is necessary to display a large image having a high resolution or a moving image.

In order to implement, i.e., set, a conventional multi-vision system, after arranging display devices, an appropriate media source should be provided to a corresponding display device based on a respective location of each portable terminal. For this, a multi-vision system manager should confirm respective locations of the display devices and then manually connect many cables to the display devices one by one, or should properly set a link between a source device and a sink device in the case of wireless communication.

SUMMARY

In an aspect, an exemplary embodiment provides a method for controlling a plurality of portable terminals by using a multi-vision controller. The plurality of portable terminals constitutes a multi-vision system. The method comprises receiving touch information relating to each of touches from at least one of the plurality of portable terminals; determining a disposition of the plurality of portable terminals based on the received touch information; and generating picture division information which indicates respective content portions to be displayed by each of the plurality of portable terminals based on the determined disposition.

The method may further comprise receiving information relating to respective resolutions and respective screen sizes of each of the plurality of portable terminals, wherein the generating of the picture division information may be performed by referring to the received information relating to the respective resolutions and the respective screen sizes of each of the plurality of portable terminals.

The touch information may include dragging inputs, and the determining of the disposition may include calculating respective relative locations of each of the plurality of portable terminals in a state in which respective tracks generated by the dragging inputs are connected with each other.

The method may further comprise receiving information relating to respective bezel widths of each of the plurality of portable terminals, wherein the calculating of the respective relative locations may include calculating, by using the information relating to the respective bezel widths, the respective relative locations of each of the plurality of portable terminals in the state in which the respective tracks are connected with each other.

The touch information may include information that indicates a start time and an end time of a touch gesture and a start location and an end location of the touch gesture.

The method may further comprise transmitting the generated picture division information to each of the plurality of portable terminals.

If a touch on a first portable terminal is received on a right side of a screen of the first portable terminal with respect to a center of the screen of the first portable terminal and a touch on a second portable terminal is received on a left side of a screen of the second portable terminal with respect to a center of the screen of the second portable terminal, the generating picture division information may include determining that the first portable terminal displays a first portion of two portions into which a whole picture is divided, and that the second portable terminal displays a second portion of the two portions.

The method may further comprise transmitting the generated picture division information to each of the plurality of portable terminals, wherein the picture division information is generated based on an assumption that each of the first portable terminal and the second portable terminal has a same respective resolution and a same respective size.

The method may further comprise starting a setting mode for implementing the multi-vision system by using the plurality of portable terminals, wherein the receiving of the touch information is performed in the setting mode.

The starting of the setting mode may be performed by receiving, from a user, input for selecting a predetermined application installed in the multi-vision controller.

In another aspect, an exemplary embodiment provides a multi-vision controller which comprises a memory in which at least one program is stored; and a processor which sets a multi-vision system which includes a plurality of portable terminals by executing the at least one program. The at least one program comprises commands which cause the multi-vision system to: receive touch information relating to each of touches from at least one of the plurality of portable terminals; determine a disposition of the plurality of portable terminals based on the received touch information; and generate picture division information which indicates respective content portions to be displayed by each of the plurality of portable terminals based on the determined disposition.

The at least one program may further comprise commands which cause the multi-vision system to receive information relating to respective resolutions and respective screen sizes of each of the plurality of portable terminals, wherein the generating of the picture division information is performed by referring to the received information relating to the respective resolutions and the respective screen sizes of each of the plurality of portable terminals.

The touch information may include dragging inputs, and the determining of the disposition may include calculating respective relative locations of each of the plurality of portable terminals in a state in which respective tracks generated by the dragging inputs are connected with each other.

The at least one program may further comprise commands which cause the multi-vision system to receive information relating to respective bezel widths of each of the plurality of portable terminals, wherein the calculating of the respective relative locations includes calculating, by using the information relating to the respective bezel widths, the respective relative locations of each of the plurality of portable terminals in the state in which the respective tracks are connected with each other.

The touch information may include information that indicates a start time and an end time of a touch gesture and a start location and an end location of the touch gesture.

The at least one program may further comprise commands which cause the multi-vision system to transmit the generated picture division information to each of the plurality of portable terminals.

If a touch on a first portable terminal is received on a right side of a screen of the first portable terminal with respect to a center of the screen of the first portable terminal and a touch on a second portable terminal is received on a left side of a screen of the second portable terminal with respect to a center of the screen of the second portable terminal, the generating picture division information may include determining that the first portable terminal displays a first portion of two portions into which a whole picture is divided, and that the second portable terminal displays a second portion of the two portions.

The at least one program may further comprise commands which cause the multi-vision system to transmit the generated picture division information to each of the plurality of portable terminals, wherein the picture division information is generated based on an assumption that each of the first portable terminal and the second portable terminal has a same respective resolution and a same respective size.

The at least one program may further comprise commands which cause the multi-vision system to start a setting mode for implementing the multi-vision system by using the plurality of portable terminals, wherein the receiving of the touch information is performed in the setting mode.

The commands which cause the multi-vision system to start the setting mode may be executed in response to received user input for selecting a predetermined application installed in the multi-vision controller.

In yet another aspect, an exemplary embodiment provides a non-transitory computer readable recording medium having recorded thereon a program for executing a method for controlling a plurality of portable terminals by using a multi-vision controller.

BRIEF DESCRIPTION OF THE DRAWINGS

The above and other features and advantages of the present inventive concept will become more apparent by describing in detail exemplary embodiments thereof with reference to the attached drawings in which:

FIG. 2 is a flowchart which illustrates a process by which a multi-vision controller controls a plurality of portable terminals, according to an exemplary embodiment;

FIG. 3 is a flowchart which illustrates a process by which a single portable terminal operates as a part of a multi-vision system, according to an exemplary embodiment;

FIG. 4 is a flowchart which illustrates a process for determining the disposition of portable terminals, according to an exemplary embodiment;

FIG. 14 is a diagram which illustrates the structure of a device for setting a multi-vision system by controlling a plurality of portable terminals, according to an exemplary embodiment.

DETAILED DESCRIPTION OF THE INVENTION

Hereinafter, exemplary embodiments will be described in detail with reference to the accompanying drawings. Expressions such as "at least one of," when preceding a list of elements, modify the entire list of elements and do not modify the individual elements of the list.

Figure 1A:
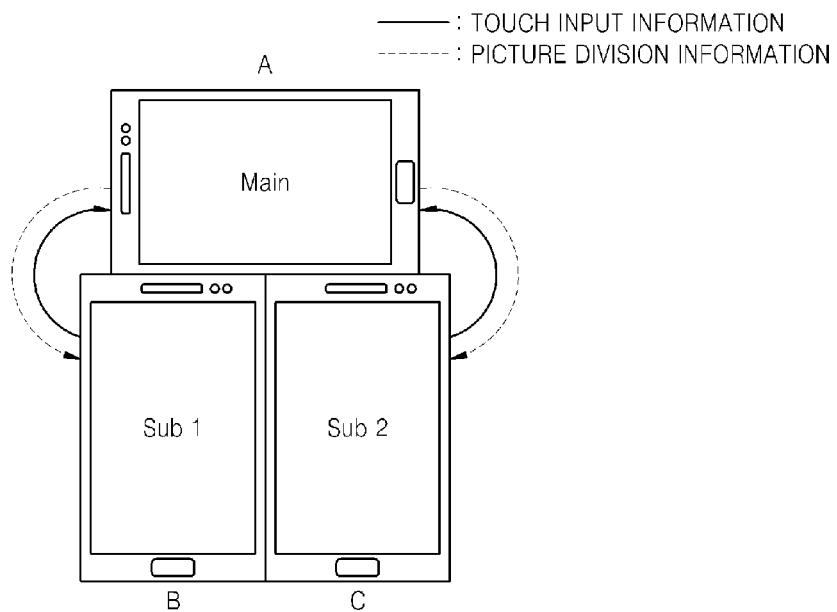
FIGS. 1A, 1B, and 1C are conceptual diagrams which illustrate a process for setting a multi-vision system in one of a plurality of portable terminals, according to an exemplary embodiment.
Figure 1B:
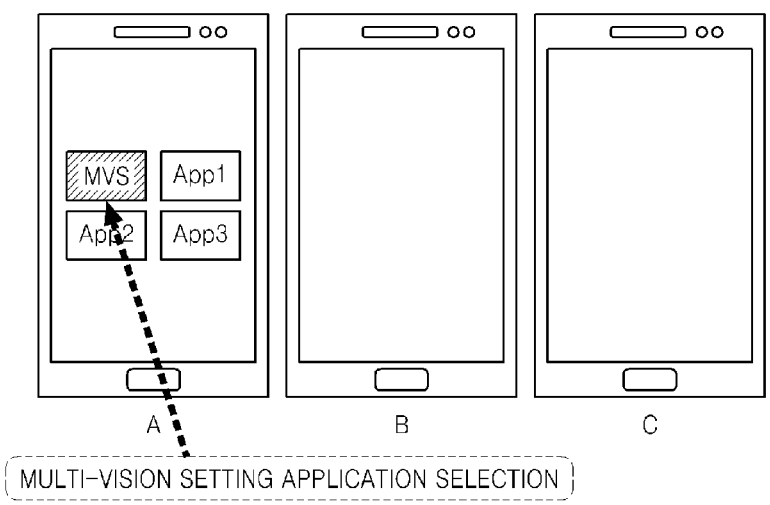
Figure 1C:
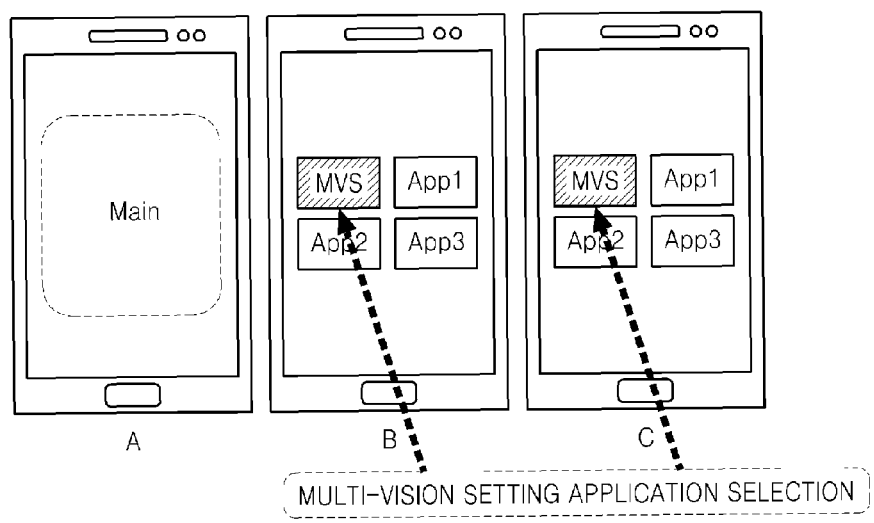

FIGS. 1A, 1B, and 1C are conceptual diagrams which illustrate a process for setting a multi-vision system in one of a plurality of portable terminals, according to an exemplary embodiment.

The term "portable terminals" refers to mobile devices, which may include a display device, and which are capable of communicating with the outside, such as cellular phones, smart phones, personal multimedia players (PMPs), MP3 players, e-book readers, tablet PCs, and the like. Although in each of FIGS. 1A, 1B, 1C, and 1D, each of the plurality of portable terminals A, B, and C includes a home button, it will be obvious to one of ordinary skill in the art that a portable terminal that does not include a home button, which depends on a manufacturer and model, may be applied to the exemplary embodiments described herein.

According to the current exemplary embodiment, a user arbitrarily arranges the plurality of portable terminals A, B, and C, adjacently to each other, in order to implement a multi-vision system, executes a menu or an operating system (OS) and an application which is configured to implement the multi-vision system in each portable terminal, and then performs a touch input under these conditions (hereinafter, referred to as a multi-vision setting mode). If the user performs a touch input in each of the plurality of portable terminals A, B, and C in order to configure the multi-vision system, since an apparatus (hereinafter, referred to as a multi-vision controller) for implementing the multi-vision system by using the plurality of portable terminals may determine the arrangement of the plurality of portable terminals based on the received touch input, the user does not need to map a location of each portable terminal into content which each portable terminal should display.

The apparatus for implementing the multi-vision system by using the plurality of portable terminals A, B, and C, that is, the multi-vision controller, may be included in one of the plurality of portable terminals A, B, and C constituting the multi-vision system, or may be included in an independent server. Hereinafter, if the multi-vision controller is included in one of the plurality of portable terminals A, B, and C constituting the multi-vision system, the terminal which includes the multi-vision controller is referred to as a main device and the other portable terminals are referred to as subsidiary devices.

As illustrated in FIG. 1A, in the current exemplary embodiment, the multi-vision system is implemented, for example, by using three portable terminals A, B, C, the portable terminal A is set as the main device, and the other portable terminals B and C are set as the subsidiary devices.

A user may select which portable terminal to set as the main device and which portable devices to set as the subsidiary devices, and this process is illustrated in FIGS. 1B and 1C. As illustrated in FIG. 1B, first, a user executes a menu or an application (hereinafter, referred to as a multi-vision setting application, and indicated as "MVS" in FIGS. 1B and 1C) for setting the multi-vision system in the portable terminal A. The portable terminal A starts the multi-vision setting mode for implementing the multi-vision system and senses surrounding portable terminals by using a near field communication (NFC) protocol. The portable terminal A in which the multi-vision setting mode is first executed is set as the main device. Alternatively, the portable terminal A may be set as a subsidiary device by providing input based on the menu or a multi-vision setting application. In this case, one of the other portable terminals B and C may be set as the main device.

As illustrated in FIG. 1C, if the user selects a multi-vision setting application of one of the other portable terminals B and C in a state in which the portable terminal A is set as the main device, the selected portable terminal B or C starts the multi-vision setting mode, and then senses that the portable terminal A has been already set as the main device, by using the NFS protocol, and is automatically set as the subsidiary device. Various kinds of communication protocols such as Wi-Fi, Bluetooth, and the like may be used as the NFS protocol, but the present exemplary embodiment is not limited thereto.

In addition, if the user brings the portable terminal A into contact with the portable terminals B and C after setting the portable terminal A as the main device, the portable terminals B and C may be set as the subsidiary devices via a NFC function of the portable terminals A, B, and C.

As illustrated in FIG. 1A, in the case where the portable terminals A, B, and C are in the multi-vision setting mode, if the user inputs a touch input for a multi-vision setting to each of the portable terminals A, B, and C, the portable terminals B and C that are the subsidiary devices transmit respective information relating to each touch input to the portable device A that is the main device, and the main device A determines respective relative locations of the subsidiary devices B and C based on the received touch input information. The touch input information may include a respective start time and a respective end time of each touch input and a respective start location and a respective end location of each touch input. The main device A determines the disposition of each portable terminal by obtaining respective relative locations of the subsidiary devices B and C by using a respective track or location of the corresponding touch input based on the received touch input information. A method for obtaining a relative location of a portable terminal by using touch input information will be described below in more detail with reference to FIGS. 6, 7, and 8.

The main device A determines a respective content portion to be displayed by each corresponding portable terminal after determining the disposition of all portable terminals based on the locations of the subsidiary devices B and C. The main device A generates picture division information corresponding to the contents and then transmits the generated picture division information to each of the subsidiary devices B and C.

The picture division information relates to a respective portion of the content to be displayed by each corresponding portable terminal via multi-vision. The content to be displayed through the multi-vision may include an image, a moving image, a user interface, digital multimedia broadcasting (DMB) that is received from outside, a game that is executed from a server on a network, and/or any other suitable content, but the exemplary embodiments are not limited thereto. In addition, the content may also include content that is received from an external server via streaming and/or local content stored in a portable terminal.

The picture division information may include coordinates of pixels indicating a portion of content to be displayed, for example, a portion of the whole size of an image or moving image or may be an image or moving image from which a portion of content is cut. For example, if the portable terminals A, B, and C are disposed as illustrated in FIG. 1C, in order to display an image having a 1024×768 size by using multi-vision, the main device A displays a left part (columns: 0-341, rows: 0-767) of the whole image by dividing the whole image into three parts. In addition, the main device A generates picture division information indicating remaining parts to be displayed by the subsidiary devices B and C, and then transmits the generated picture division information to each of the subsidiary devices B and C. In this case, picture division information that is transmitted to the subsidiary device B includes pixel coordinates (columns: 342-682, rows: 0-767) indicating a center part of the whole image, and picture division information that is transmitted to the subsidiary device C includes pixel coordinates (columns: 683-1023, rows: 0-767) indicating a right part of the whole image. In addition, in the case of a three dimensional image or a moving image, the picture division information may further include information indicating a depth of content and/or a column and row of the content.

Figure 1D:
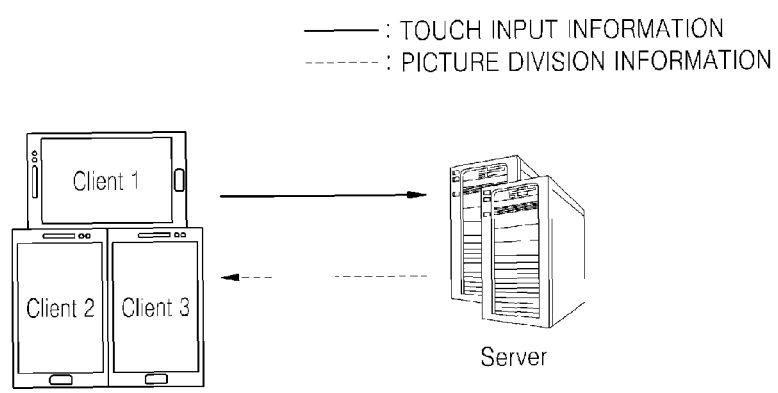
FIG. 1D is a conceptual diagram which illustrates a process for setting a multi-vision system in an external server, according to another exemplary embodiment.

FIG. 1D is a conceptual diagram which illustrates a process for setting a multi-vision system in an external server, according to another exemplary embodiment.

Unlike the case of FIG. 1A, in the embodiment of FIG. 1D, a multi-vision controller is not included in one of a plurality of portable terminals constituting the multi-vision system, but instead is included in an external independent server. In particular, the plurality of portable terminals equally operate as clients, and the server starts a multi-vision setting mode in response to a request which is received from at least one of the plurality of portable terminals. Then, the external server receives touch input information via a broadband network, such as 3G/4G and the like, or a local area network, such as WLAN and the like, from at least one of the plurality of portable terminals. The external server determines an arrangement of the plurality of portable terminals based on the touch input information, and then generates picture division information indicating respective content to be displayed by each portable terminal based on the arrangement of the plurality of portable terminals and transmits the generated picture division information to each of the plurality of portable terminals.

For example, when displaying an image having a 400×800 size via a multi-vision system in a state in which the plurality of portable terminals are arranged as illustrated in FIG. 1D, picture division information that is transmitted to a client 1 may include pixel coordinates indicating columns 200-379 and rows 0-299 of the whole image, picture division information that is transmitted to a client 2 may include pixel coordinates indicating columns 0-199 and rows 300-799 of the whole image, and picture division information that is transmitted to a client 3 may include pixel coordinates indicating columns 200-399 and rows 300-799 of the whole image.

The arrangement of the plurality of portable terminals may be determined by using a contactless sensor which is capable of detecting gestures, which are performed by using tools such as fingers of a user or a stylus pen, in a three dimensional space. Each of the plurality of portable terminals may sense an input which corresponds to a user gesture such as dragging, tapping, or the like by using a contactless sensor such as a camera, a motion sensor, or the like, and the arrangement of the plurality of portable terminals may be calculated by using the sensed user gesture. In the exemplary embodiments, the term "dragging" refers to a gesture whereby a touch point continuously moves from one location to another location, and is a term which includes all of various inputs which are generated by a movement of the touch point, for example, a flick, a rotation, a pinch, and the like.

FIG. 2 is a flowchart which illustrates a process by which a multi-vision controller controls a plurality of portable terminals, according to an exemplary embodiment.

In operation 201, the multi-vision controller starts a multi-vision setting mode. As described above, in the case where the multi-vision controller is included in one of the plurality of portable terminals constituting a multi-vision system, the multi-vision controller may start a multi-vision mode by executing a specific application or a menu. Also in the case where the multi-vision controller is included in an independent server, a user may submit a request to the server in order to start the multi-vision setting mode by using a specific application or a menu of a portable terminal. The server starts the multi-vision setting mode in response to a request received from a portable terminal, and operation 201 corresponds to this process.

Communication between the multi-vision controller and the portable terminals may be performed according to various standard networks, such as, for example, Wi-Fi Direct, Bluetooth, 3G/4G, global system for mobile communication (GSM), and the like, and a protocol for constituting a multi-vision is not limited to a specific communication protocol. However, the portable terminals should obtain network information (for example, IP addresses or port numbers) of the multi-vision controller in advance.

In operation 202, the multi-vision controller receives touch input information which has been input to each of the portable terminals. The touch input information may include a respective start time and a respective end time of a touch input and a respective start location and a respective end location of the touch input. The touch input information may be generated by various touch gestures such as dragging, tapping, and the like, and may be generated also by a multi-touch gesture. As described above, the term "dragging" refers to a touch gesture in which a touch point moves from one location from another location, and includes various gestures using a dragging method, for example, a sweep, a swipe, a pinch, a rotation, and/or any other suitable gesture.

In operation 203, the multi-vision controller receives device information from the portable terminals. The device information may indicate, for example, a bezel width (for example, 5 mm), a resolution (for example, 480×800), a screen size (for example, 4.0 inches), and/or any other relevant device-related information relating to each of the portable terminals. Although multi-vision may be implemented only by determining the arrangement of the portable terminals, if the device information is used, identification of content may be enhanced when constituting a single content picture via multi-vision. For example, when displaying a single circle by using a plurality of portable terminals, connection portions of the circle may be naturally smoothed by determining the spatial arrangement of the plurality of portable terminals in consideration of a respective bezel width of each of the plurality of portable terminals. In addition, a curvature of the circle and a thickness of the line of the circle may be uniformly maintained by determining the number of pixels which form the thickness of the line, and the size of the circle in consideration of a resolution and a respective screen size of each of the plurality of portable terminals. The device information may be included in the touch input information.

Device characteristics such as the bezel width, the screen size, the resolution, and the like may vary according to manufacturers and models. Although the portable terminals have different device characteristics, by installing an application for setting the multi-vision system according to the exemplary embodiment, the multi-vision system may be implemented by using the portable terminals having various specifications.

In operation 204, the multi-vision controller determines the disposition of the portable terminals based on the received touch input information. The touch input may be performed as a dragging gesture moving from a touch screen of one portable terminal to a touch screen of another portable terminal. In this case, the disposition, or spatial arrangement, of the portable terminals may be determined by connecting tracks of the dragging input to each other. A detailed description of operation 204 will be described below with reference to FIG. 4.

The touch input may include a simple tapping input. In this case, the multi-vision controller may recognize that two portable terminals having the same resolution and the same screen size are placed in a line. A detailed description regarding this scenario will be described below with reference to FIG. 8.

In operation 205, the multi-vision controller determines respective content portions to be displayed by the corresponding portable terminals based on the determined disposition of the portable terminals. The content portions may include different portions of the same picture, or may include different pictures. A detailed description regarding this scenario will be described below with reference to FIG. 9.

In operation 206, the multi-vision controller generates picture division information indicating the respective content portions to be displayed by the corresponding portable terminals. As described above, the picture division information may include an image or moving image format, or may include coordinates designating a portion of the whole picture of a content. In addition, because the picture division information is generated in consideration of the device information of the portable terminals, the picture division information may include information relating to respective resolutions and sizes to be applied to the respective content portions.

In operation 207, the multi-vision controller transmits the picture division information to each of the portable terminals.

FIG. 3 is a flowchart which illustrates a process by which a single portable terminal operates as a part of a multi-vision system, according to an exemplary embodiment. In particular, processes that are performed in a case in which the portable terminal does not operate as a multi-vision controller, but instead as a subsidiary device or a client, are described.

In operation 301, the portable terminal starts a multi-vision setting mode. In particular, if a user executes an application or a menu for implementing a multi-vision system, the portable terminal enters into the multi-vision setting mode and then stands by for a touch input of the user.

In operation 302, the portable terminal receives a touch input from the user. In operation 303, the portable terminal generates touch input information relating to the user's touch input received in operation 302 and then transmits the generated touch input information to the multi-vision controller. Thus, the portable terminal should obtain network information (for example, IP addresses or port numbers) relating to the multi-vision controller in advance. As described above, the touch input information may include a respective start time and a respective end time of a touch input and a respective start location and a respective end location of the touch input.

In operation 304, the portable terminal receives picture division information from the multi-vision controller.

In operation 305, the portable terminal displays a content portion that is indicated by the picture division information. When the picture division information is provided in a format of a moving image or image, that is, the picture division information includes data indicating a portion of a content picture, the portable terminal displays the received picture division information. If the picture division information is provided in a form of pixel coordinates indicating a portion of the whole picture, the portable terminal generates a content portion to be displayed by itself by dividing the content in accordance with the picture division information. Data relating to the whole content may be stored in the portable terminal, may be received from the multi-vision controller, or may be received from an external content server. However, because all portable terminals constituting a multi-vision system should display content portions together, a synchronization process between the portable terminals is necessary. The synchronization process may be performed at any time point in the process during which operations illustrated in FIG. 3 are performed, and a synchronization protocol is not limited to a specific protocol.

FIG. 4 is a flowchart which illustrates a process of determining the disposition of portable terminals, according to an exemplary embodiment.

In the current exemplary embodiment, it is assumed that a touch input is a dragging gesture input that moves from a touch screen of one portable terminal to a touch screen of another portable terminal. When the number of portable terminals constituting the multi-vision system is two, a dragging input starts in one portable terminal and ends in the other portable terminal. When the number of portable terminals constituting the multi-vision system is more than three, a dragging input starts in a first portable terminal in which a touch has started and may end in the first portable terminal after passing through the other portable terminals. Otherwise, a dragging input starts in the first portable terminal and may end in one of the other portable terminals after passing through one or more of the other portable terminals. The touch input may include an input which is performed by using a multi-touch method.

Below, operation 204, which relates to determining the disposition of the portable terminals as illustrated in FIG. 2, is described in detail.

In operation 401, the multi-vision controller calculates tracks of drag inputs which have been received via the portable terminals. A track which corresponds to a dragging input performed by a finger of a user is formed of a plurality of pixels, and the multi-vision controller calculates the track by analyzing the plurality of pixels. A track which corresponds to a dragging input received from a single portable terminal uses a time when and a location where the touch is first sensed and a time when and a location where the touch is finally sensed. Alternatively, this operation may be performed in a portable terminal other than the multi-vision controller (that is, a subsidiary device or another client).

In operation 402, the multi-vision controller calculates relative locations of the portable terminals when connecting the tracks which are calculated in operation 401. In this case, the multi-vision controller may consider respective bezel widths of the portable terminals. A more detailed explanation is described below with reference to FIG. 7.

FIGS. 5A, 5B, 5C, and 5D are diagrams which illustrate various examples of a touch input for implementing a multi-vision system.

In the current exemplary embodiment, a case in which the multi-vision system is implemented by using a track formed by a drag input is described. In detail, in FIGS. 5A, 5B, 5C, and 5D, a dragging input which is provided by moving a single touch point is described. However, an input which is provided via a multi-touch, in which a touch to a touch screen of a portable terminal is performed by using several fingers and/or a thumb, may be possible.

Figure 5A:
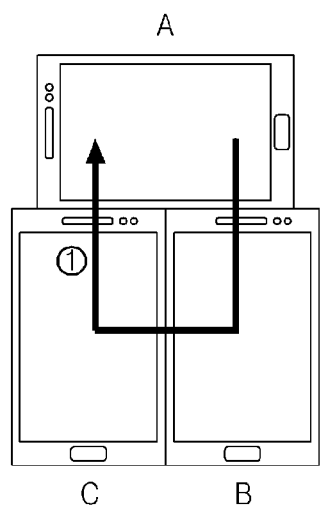
FIGS. 5A, 5B, 5C, and 5D are diagrams which illustrate various examples of a touch input for implementing a multi-vision system.
Figure 5B:
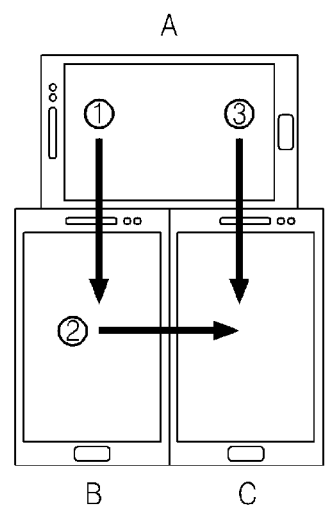

As illustrated in FIG. 5A, a user may perform a touch input to all the portable terminals A, B, and C by using a single dragging input ① which extends over all the portable terminals A, B, and C constituting a multi-vision system. As illustrated in FIG. 5B, the user may cause the multi-vision controller to determine the disposition, or spatial arrangement, of the portable terminals A, B, and C by performing a total of three dragging inputs ①, ②, and ③, each of which begins in one of the portable terminals and ends in another one of the portable terminals.

Figure 5C:
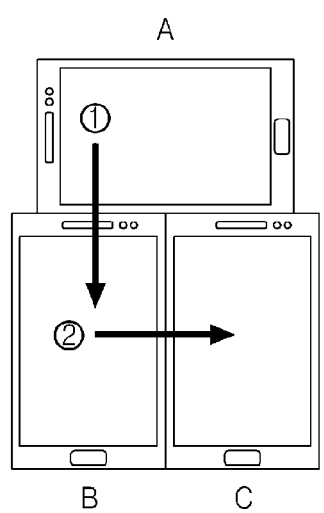
Figure 5D:
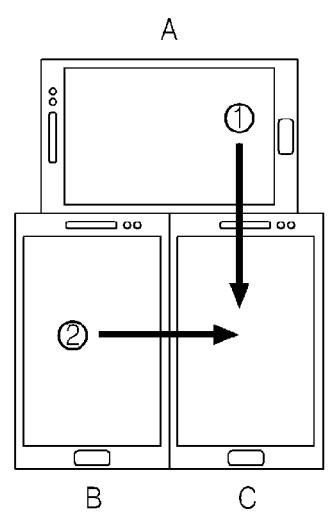

As illustrated in FIGS. 5C and 5D, the user may cause the multi-vision controller to determine the disposition of the portable terminals A, B, and C by providing only two dragging inputs ① and ②. For example, in FIG. 5C, because relative locations of the portable terminals A and B are determined based on a dragging input ① directed in a downward direction from portable terminal A to portable terminal B, and relative locations of the portable terminals B and C are determined based on a dragging input ② directed in a right direction from portable terminal B to portable terminal C, relative locations between the portable terminals A and C may be calculated. In this case, because there will be a determination that the dragging input ① extends over the portable terminals A and B, the dragging input ① should be distinguished from the dragging input ② that extends over the portable terminals B and C. Thus, the multi-vision controller may determine which portable terminals each dragging input extends over in consideration of a respective start time and a respective end time of each dragging input, and may calculate relative locations of the portable terminals A, B, and C based on the obtained result.

In addition, in FIGS. 5B, 5C, and 5D, the temporal order of dragging inputs may be changed among each other. For example, in FIG. 5B, the temporal order of the dragging inputs ①, ②, and ③ may be arbitrarily determined by a user. In addition, a user may determine the temporal order of touch inputs by using a multi-vision setting application beforehand, or may designate a schematic disposition of the portable terminals A, B, and C beforehand.

Figure 6:
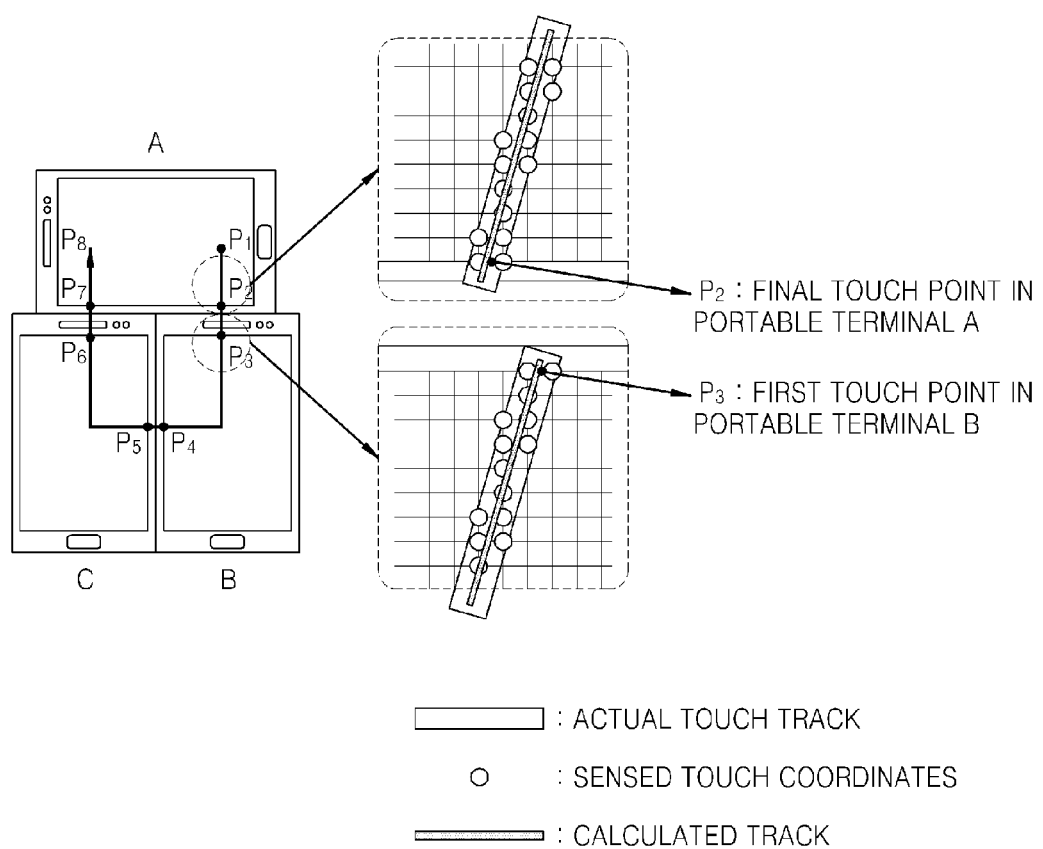
FIG. 6 is a diagram which illustrates a process for calculating a track of a dragging input, according to an exemplary embodiment.

FIG. 6 is a diagram which illustrates a process for calculating a track of a dragging input, according to an exemplary embodiment.

The left drawing of FIG. 6 illustrates a case in which a user disposes three portable terminals A, B, and C, and a dragging input starts at a touch point P1 of the portable terminal A and ends at a touch point P8 of the portable terminal A after traversing a path which proceeds approximately in a clockwise direction. In this case, touches which are input to touch screens of the portable terminals A and B may be expressed by respective continuous coordinate values, and a track is calculated, as in the right drawing of FIG. 6, by using the continuous coordinate values. The track may include a straight line and/or a curved line in consideration of patterns of coordinate values at which touches are sensed.

Since touch input information which the portable terminals A, B, and C provide to a multi-vision controller includes a start time and an end time of a respective touch gesture input to each portable terminal as well as location information such as, for example, each of the touch points P1 through P8, the temporal order of the portable terminals through which the calculated track passes may be determined by referring to the touch input information. In particular, since, in FIG. 6, touch input information relating to the portable terminal A includes respective touch times which correspond to each of the touch points P1, P2, P7, and P8, touch input information relating to the portable terminal B includes respective touch times which correspond to each of the touch points P3 and P4, and touch input information relating to the portable terminal C includes respective touch times which correspond to each of the touch points P5 and P6, it may be recognized that the touch gesture has been sequentially input in the temporal order of the portable terminals A, B, C, and A.

Figure 7:
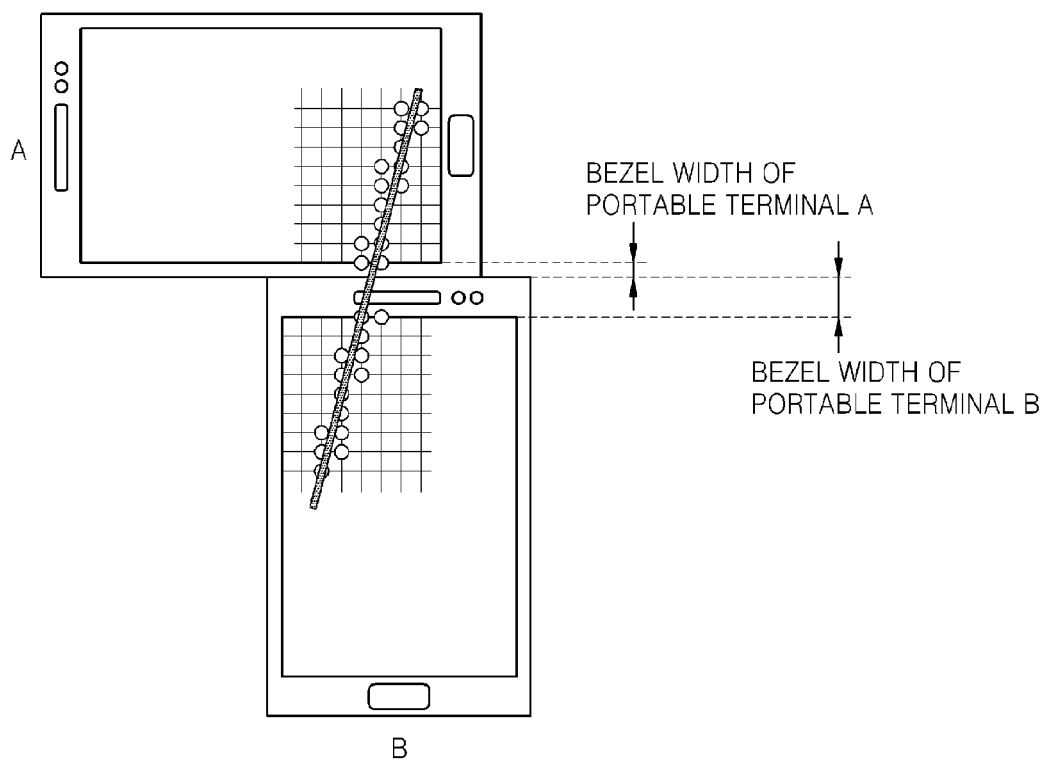
FIG. 7 is a diagram which illustrates a process for determining relative locations of portable terminals, according to an exemplary embodiment.

FIG. 7 is a diagram which illustrates a process for determining relative locations of portable terminals A and B, according to an exemplary embodiment. In particular, FIG. 7 illustrates a method for calculating relative locations of the portable terminals A and B by connecting the touch points P2 and P3 as illustrated in FIG. 6. As described with reference to FIG. 6, since it may be recognized that a next sequential touch point after the touch point P2 is the touch point P3 by referring to the touch input information, relative locations of the portable terminals A and B may be calculated by connecting a track around the touch point P2 (see the circular area indicated by an upper dotted line of the left drawing of FIG. 6), for which an end location is the touch point P2 in the portable terminal A, and a track around the touch point P3 (see the circular area indicated by a lower dotted line of the left drawing of FIG. 6), for which a start location is the touch point P3 in the portable terminal B.

Although the respective tracks input to the touch screens of two portable terminals may not be directly connected to each other because the portable terminals have a bezel, it is possible to determine how to dispose the portable terminals to allow the tracks to be naturally connected to each other by considering the widths of the bezels of the portable terminals. In particular, connecting the tracks to each other is performed by determining a virtual connection based on a consideration of the widths of the bezels of the portable terminals. Thus, in order to more correctly determine the disposition of the portable terminals, the portable terminals may transmit information relating to the respective widths of the corresponding bezels to the multi-vision controller.

Relative locations between the portable terminals A and B and between the portable terminals B and C may be calculated by the same method, and, consequently, the multi-vision controller may determine that the portable terminals A, B, and C have been arranged as shown in the left drawing of FIG. 6 based on touch input information relating to each of the portable terminals A, B, and C.

Figure 8:
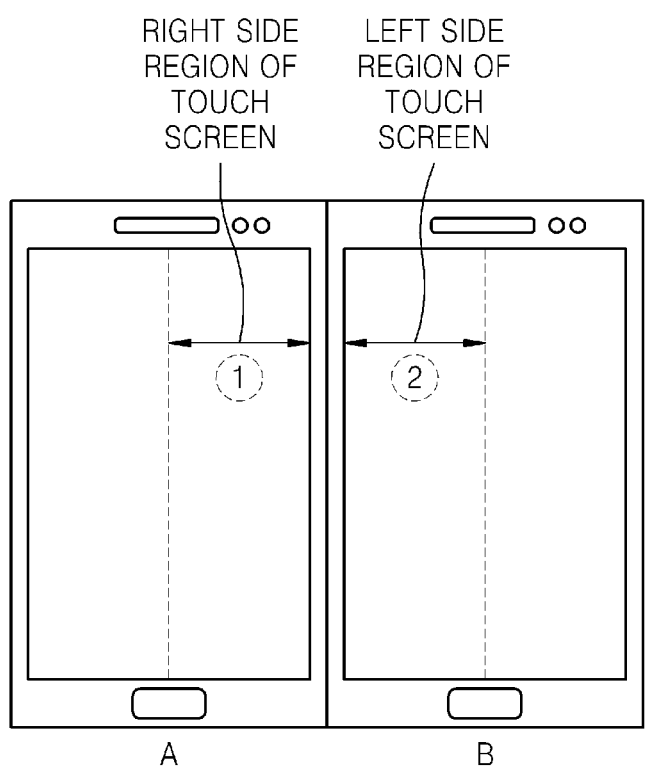
FIG. 8 is a diagram which illustrates a process for determining relative locations of portable terminals, according to another exemplary embodiment.

FIG. 8 is a diagram which illustrates a process for determining relative locations of portable terminals A and B, according to another exemplary embodiment. In the current exemplary embodiment, unlike the exemplary embodiment illustrated in FIG. 6, it is assumed that a user's touch input includes a tapping input. A multi-vision controller may be included in one of the portable terminals A and B, or may be included in an external server (not shown).

As illustrated in FIG. 8, if a user taps a portion 1 of the portable terminal A, i.e., a right side region of a touch screen of the portable terminal A, and a portion 2 of the portable terminal B, i.e., a left side region of a touch screen of the portable terminal B, a multi-vision controller of a presently implemented multi-vision system determines that the screens of the two portable terminals A and B having a same screen size are located on the same X axis and determines that the portable terminal A is located on the left side and the portable terminal B is located on the right side.

Alternatively, an algorithm may be used. In particular, the multi-vision controller may determine that the portable terminal B, in which a tap is input to the left side region of the touch screen thereof, is located on the right side and the portable terminal A, in which a tap is input to the right side region of the touch screen thereof, is located on the left side. Although not illustrated, a multi-vision system may be implemented based on a time interval between two touch inputs without determining locations of the two touch inputs on a touch screen. For example, in the multi-vision setting mode, a portable terminal in which a touch input is first received may be located on the left side, and a portable terminal in which a touch input is secondly received may be located on the right side (the reverse is also possible). It may be determined that two portable terminals have the same screen size and are disposed in a line so that the screens of the two portable terminals are located on the same X axis. In particular, if the multi-vision controller receives information relating to two touch inputs in the multi-vision setting mode, the multi-vision controller may determine the disposition for two portable terminals by using input times included in the information relating to the two touch inputs, although the information relating to the two touch inputs does not include information relating to respective locations of the two touch points.

In another algorithm, after two portable terminals start a multi-vision setting mode, when a touch input is received in only a first portable terminal and then a predetermined time elapses, it may be determined that a second portable terminal having the same screen size as the first portable terminal is located along a line on the right side or left side of the first portable terminal that has received the touch input. In this case, the touch input may include a tap, a dragging input, and/or any other suitable type of touch input.

Figure 9A:
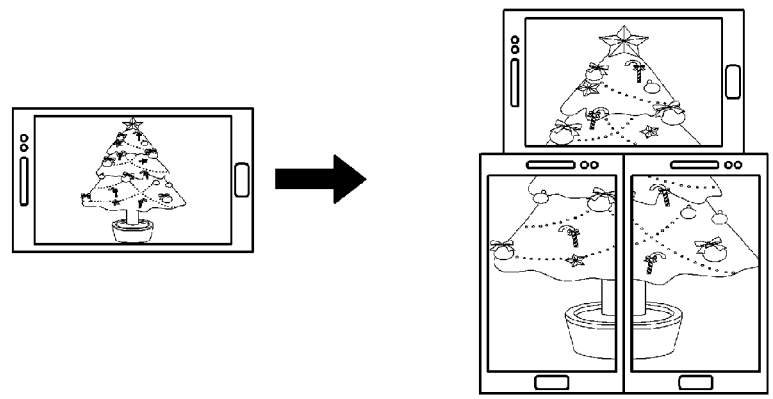
FIGS. 9A and 9B are diagrams which illustrate a multi-vision screen, according to an exemplary embodiment.
Figure 9B:
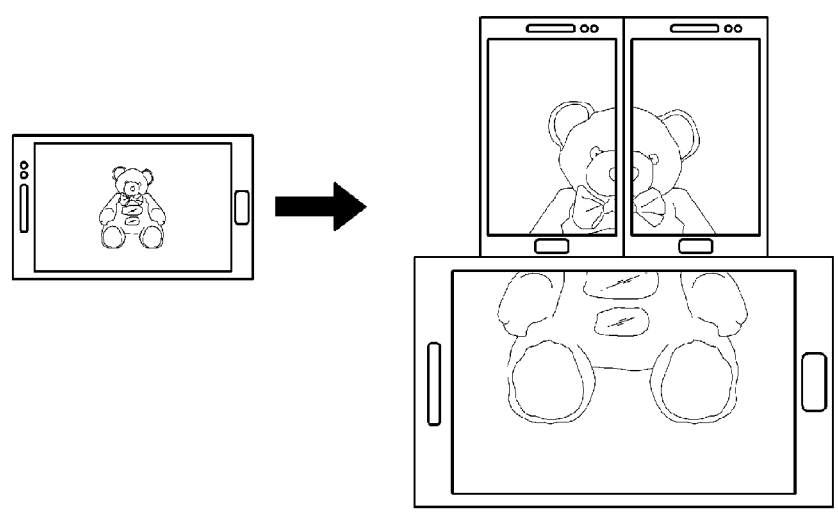

FIGS. 9A and 9B are diagrams which illustrate a multi-vision screen according to an exemplary embodiment.

As illustrated in FIGS. 9A and 9B, in the current exemplary embodiment, a multi-vision system is implemented by using three portable terminals, and thus may more largely display the same image, as compared to a situation of displaying the same image on only one portable terminal.

In this manner, according to the current exemplary embodiment, because a user may quickly implement a multi-vision system by using only a simple touch input after freely arranging portable terminals, the arrangement of the portable terminals may be optimized based on a characteristic of the content. For example, the size of an image to be displayed may be maximized by arranging the portable terminals based on a shape of the image to be displayed.

Figure 10:
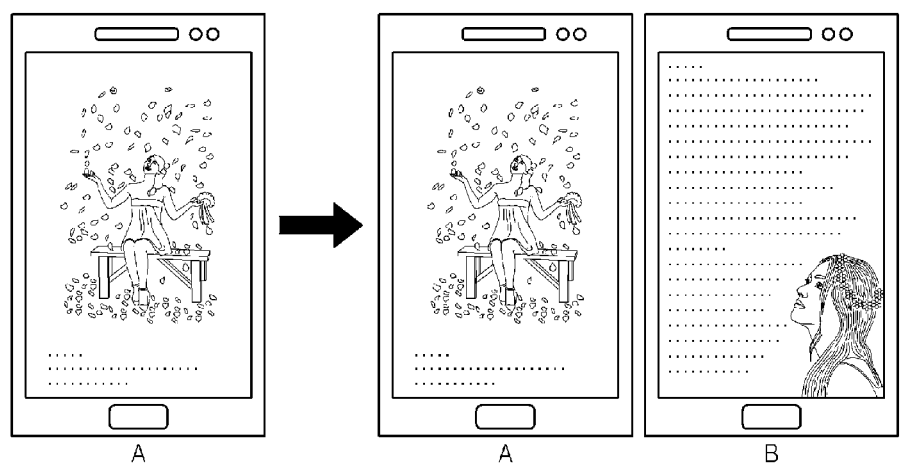
FIG. 10 is a diagram which illustrates a multi-vision screen according to another exemplary embodiment.

FIG. 10 is a diagram which illustrates a multi-vision screen according to another exemplary embodiment.

As illustrated in FIG. 10, according to the current exemplary embodiment, when images having the same size, for example, images of a book's contents, continue, a user experience of actually reading a book may be similarly implemented by linearly juxtaposing two portable terminals having similar screen sizes, for example, two portable terminals having a screen size difference of less than 0.7 inches. When a book's contents are browsed by using a single portable terminal as in the drawing of FIG. 10, only one page is displayed. However, if a portable terminal B having the same screen size as the portable terminal A as in the drawing of FIG. 10 is arranged on the right side of the portable terminal A, a user may have an experience similar to a book being actually open, because it is possible to display a single page for each screen.

For example, a user arranges the portable terminal B, as illustrated in the right drawing of FIG. 10, while browsing a book's contents, which are stored in the portable terminal A, by using the portable terminal A as illustrated in the left drawing of FIG. 10. Then, if the user sets the portable terminal A to operate as a main device and sets the portable terminal B to operate as a subsidiary device, by using a specific application or a menu in the portable terminal A, the portable terminal A, which is operating as the main device, generates picture division information by using data of a next page with respect to a presently displayed page. The portable terminal A causes the portable terminal B to display the next page by transmitting the generated picture division information to the portable terminal B.

Figure 11:
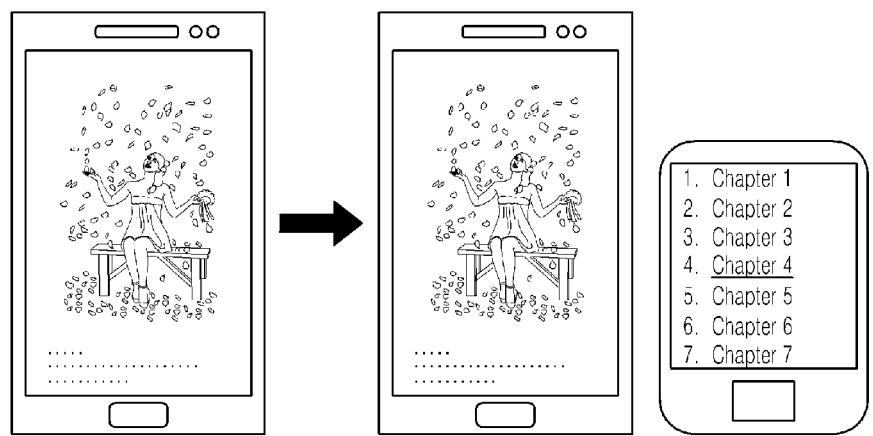
FIG. 11 is a diagram which illustrates a multi-vision screen according to another exemplary embodiment.

FIG. 11 is a diagram which illustrates a multi-vision screen according to another exemplary embodiment. In the current exemplary embodiment, it is assumed that respective screen sizes of portable terminals are different from each other.

If a multi-vision system is implemented by using two portable terminals having different respective screen sizes and different respective resolutions, the generation of respective content portions by dividing a single picture may be inefficient. For example, if a single image or a moving image is displayed together by using a first portable terminal which has a screen size of 4.5 inches and a resolution of 960×640 and a second portable terminal which has a screen size of 3.5 inches and a resolution of 480×320, the whole content may be unnaturally displayed due to a screen size difference and a resolution difference. In particular, this is more apparent in the case in which content is formed with tetragonal images having the same size, such as in the case of books.

In this case, as illustrated in FIG. 11, if a single independent page is displayed in a large first portable terminal, and index information relating to the whole book, instead of a next page, is displayed in a small second portable terminal, a user may efficiently browse the book's contents. For example, a user may know to which chapter a page presently displayed in the large first portable terminal belongs, based on the image displayed on the screen of the small second portable terminal, and may jump past the page displayed in the large first portable terminal to a desired chapter by tapping a specific chapter displayed in the small second portable terminal. A multi-vision controller may provide various services by generating picture division information in consideration of respective device characteristics of the corresponding portable terminals. In particular, the multi-vision controller generates picture division information to be displayed by each portable terminal in consideration of respective screen sizes and respective resolutions included in respective device information relating to the corresponding portable terminals. In the case of FIG. 11, the multi-vision controller senses which one of the two portable terminals has a smaller screen size with reference to the respective device information of the portable terminals, and transmits picture division information indicating index information of a book's contents to a portable terminal having a smaller screen size.

Figure 12:
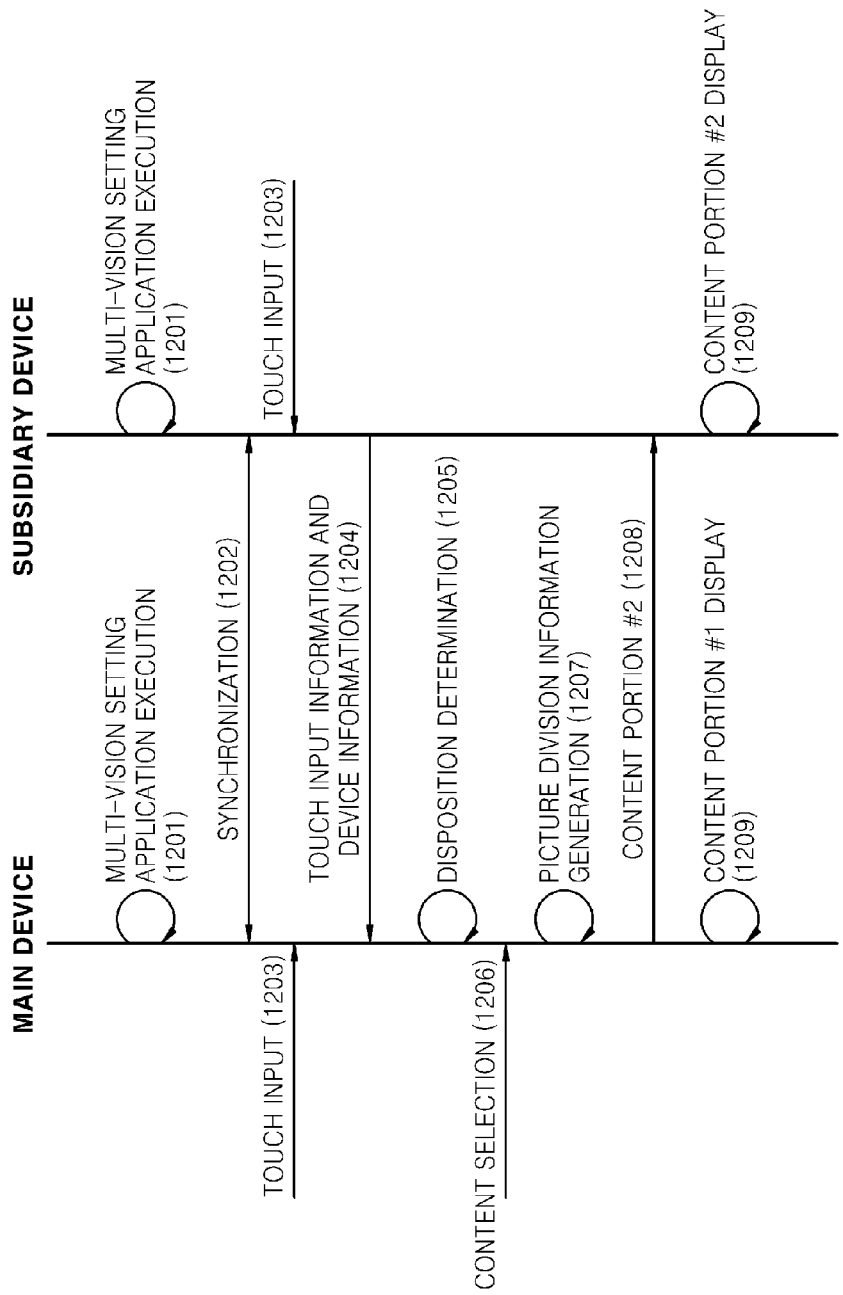
FIG. 12 is a signal flow diagram which illustrates a process by which a main device and a subsidiary device communicate with each other, according to an exemplary embodiment.

FIG. 12 is a signal flow diagram which illustrates a process by which a main device and a subsidiary device communicate with each other, according to an exemplary embodiment. In particular, in the exemplary embodiment of FIG. 12, one of the portable terminals constituting a multi-vision system operates as the main device by functioning as a multi-vision controller, and the other portable terminal operates as the subsidiary device. In addition, although, in FIG. 12, there is only one subsidiary device, it will be understood by those of ordinary skill in the art that there may be two or more subsidiary devices.

In operation 1201, the main device and the subsidiary device start a multi-vision setting mode by executing a multi-vision setting application in response to receiving an input from a user. As described above with reference to FIGS. 1B and 1C, the main device and the subsidiary device may be determined based on an input received from a user, or may be determined based on a temporal order of starting the multi-vision setting mode. After starting the multi-vision setting mode, the order of starting the multi-vision setting mode may be determined by communication among the portable terminals which is performed by using a near field communication (NFC) protocol such as Wi-Fi Direct, Bluetooth, and the like.

In operation 1202, the main device and the subsidiary device perform time synchronization. The time synchronization is necessary to allow the main device and the subsidiary device to accurately and simultaneously display respective content portions in operation 1209. In addition, the time synchronization is necessary also to accurately analyze the order of touch inputs in operation 1203. A time synchronization protocol is not limited to any specific one.

In operation 1203, the main device and the subsidiary device receive a touch input from a user. As described above, the touch input may be generated by performance of various gestures such as dragging, tapping, and the like, and also may include input which is generated by using a multi-touch method.

In operation 1204, the subsidiary device transmits touch input information and device information to the main device. As described above, the touch input information may include a start time and an end time of a touch input and a start location and an end location of the touch input, and the device information may include information relating to a bezel width, a resolution, a screen size, and/or any other relevant information which relates to the subsidiary device.

In operation 1205, the main device determines the disposition, or spatial arrangement, of the portable terminals, i.e., the main device and the subsidiary device, based on the touch input information and the device information received from the subsidiary device.

In operation 1206, the main device receives input from a user for selecting content to be displayed via a multi-vision system. Alternatively, the input may be provided by the user prior to or in conjunction with another operation. For example, content to be displayed via the multi-vision system may be specified by a user in advance before operation 1201.

In operation 1207, the main device generates picture division information relating to selected content. In the current exemplary embodiment, it is assumed that the main device generates a content portion #2 to be displayed by the subsidiary device by directly dividing a whole content picture. In particular, the picture division information includes the content portion #2 to be displayed by the subsidiary device.

In operation 1208, the main device transmits the content portion #2 to the subsidiary device. In this case, data communication may be performed by using any one or more of various communication protocols such as Wi-Fi Direct, Bluetooth, 3G/4G, GSM, and the like, and is not limited to any specific one. In addition, a communication protocol that is used in operation 1208 may not be the same as the communication protocol used in operation 1201.

In operation 1209, the main device displays a content portion #1, and, at the same time, the subsidiary device displays the content portion #2. Although time synchronization between the main device and the subsidiary device has been previously performed in operation 1202, an additional message exchange may be required for the synchronization of content reproduction.

Figure 13:
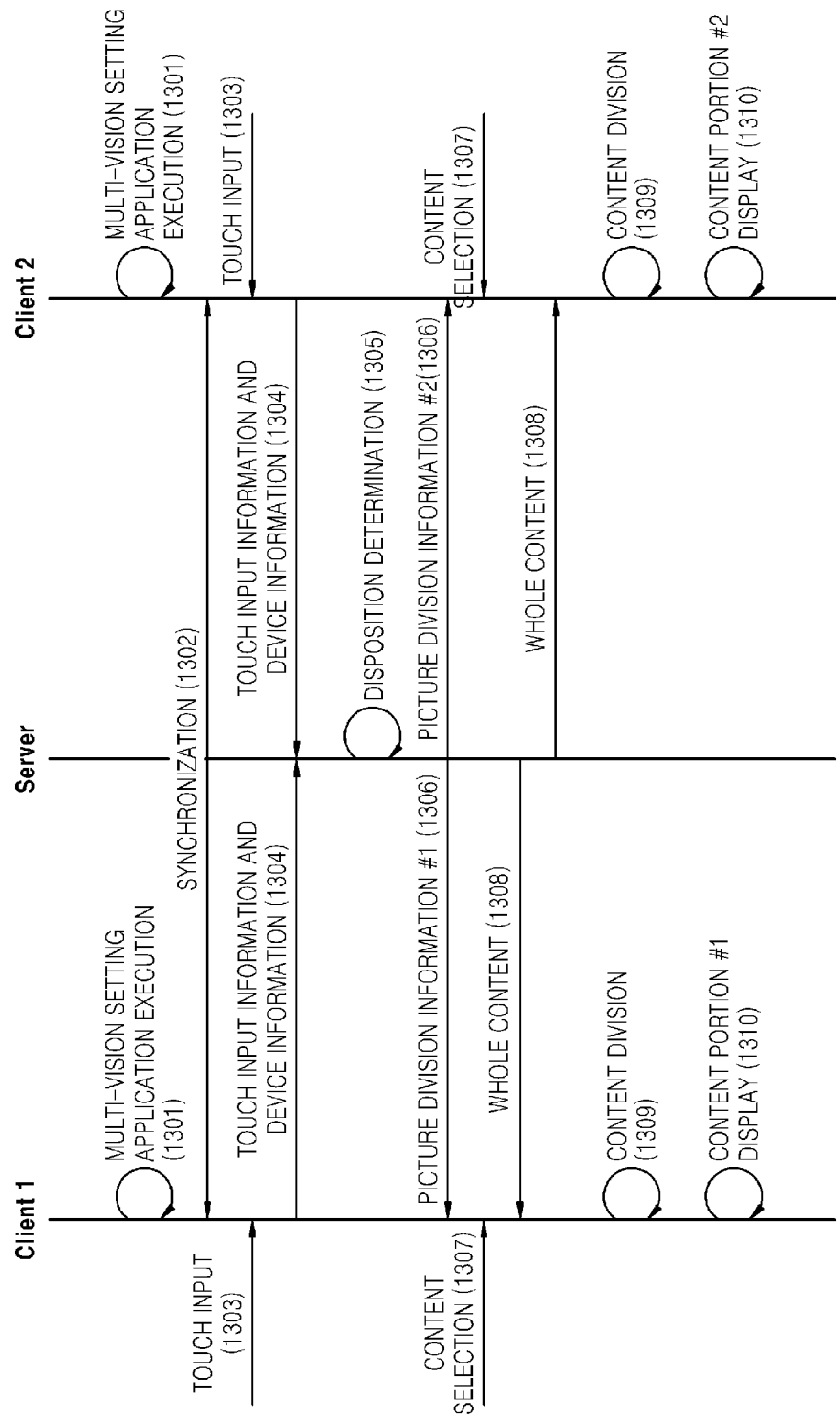
FIG. 13 is a signal flow diagram which illustrates a process by which a server and clients communicate with each other, according to an exemplary embodiment.

FIG. 13 is a signal flow diagram which illustrates a process by which a server and clients communicate with each other, according to an exemplary embodiment. In particular, in the current exemplary embodiment, all portable terminals constituting a multi-vision system operate as clients, and an independent server operates as a multi-vision controller.

In operation 1301, each of a client 1 and a client 2 performs a multi-vision setting application to start a multi-vision setting mode.

In operation 1302, the client 1 and the client 2 perform time synchronization.

In operation 1303, each of the client 1 and the client 2 transmits respective touch input information and respective device information to the server.

In operation 1305, the server determines the disposition, or spatial arrangement, of the portable terminals, i.e., the client 1 and the client 2, based on the received touch input information and the received device information.

In operation 1306, the server generates picture division information and then transmits the generated picture division information to each of the client 1 and the client 2. In the current exemplary embodiment, it is assumed that the picture division information includes information relating to how to divide a single picture, for example, information relating to pixel coordinates and the size of a picture to be displayed. Thus, a process for generating a respective content portion by dividing the whole picture is performed in each client.

In operation 1307, each of the client 1 and the client 2 receives input from a user for selecting content to be displayed via a multi-vision implementation.

In operation 1308, each of the client 1 and the client 2 downloads the whole content selected by a user from the server.

In operation 1309, each of the client 1 and the client 2 divides the whole content received in operation 1308 based on the respective picture division information received from the server. For example, when a content to be displayed via a multi-vision implementation is a moving image, the client 1 may generate a content portion #1 by using a left half of a moving image picture, and the client 2 may generate a content portion #2 by using a right half of the moving image picture.

In operation 1310, the client 1 displays the content portion #1, and the client 2 displays the content portion #2. In this case, because the client 1 and the client 2 should simultaneously display respective content portions, an additional message exchange may be required for the synchronization of content reproduction.

FIG. 14 is a diagram which illustrates the structure of a device for setting a multi-vision system by controlling a plurality of portable terminals, according to an exemplary embodiment. In the current exemplary embodiment, it is assumed that a multi-vision controller 1400 is included in one of the portable terminals constituting the multi-vision system. In particular, in the current exemplary embodiment, the multi-vision controller 1400 is a main device, and the other portable terminals are subsidiary devices.

A mobile communication unit 1401 performs call-setup and data communication via a mobile communication network such as 3G/4G. A sub-communication unit 1402 performs a process for local area communication such as Bluetooth, NFC, or the like. The broadcasting unit 1403 receives a digital multimedia broadcasting (DMB) signal.

The camera unit 1404 includes lenses and optical devices which capture an image or a moving image. Although in FIG. 14, the camera unit 1404 includes two cameras, i.e., first and second cameras, the camera unit 1404 may include a single camera or more than two cameras.

A sensing unit 1405 may include any one or more of a gravity sensor which senses a motion of the multi-vision controller 1400, an illumination sensor which senses the brightness of light, an approach sensor which senses an extent of an approach of a person or object, and a motion sensor which senses a motion of a person or a motion of an object.

A global positioning system (GPS) receiver 1406 receives a GPS signal from an artificial satellite. By using the GPS signal, various services may be provided to a user.

An input/output unit 1410 provides an interface between a controller 1450 and an external device or a person, and includes a button 1411, a microphone 1412, a speaker 1413, a vibration motor 1414, a connector 1415, and a keypad 1416.

A touch screen 1418 receives a touch input from a user. The touch input may include an input which is generated by a dragging gesture, or may include an input which is generated by a tapping gesture. A touch screen controller 1417 transmits the touch input received via the touch screen 1418 to the controller 1450. A power supply unit 1419 is connected with a battery or an external power source in order to supply a power for use by the multi-vision controller 1400.

The controller 1450 controls units illustrated in FIG. 14 by executing programs stored in a memory 1460, and performs various functions of the multi-vision controller 1400.

The programs stored in the memory 1460 may be classified into a plurality of modules according to functions thereof. In particular, the programs may be classified into a mobile communication module 1461, a Wi-Fi module 1462, a Bluetooth module 1463, a DMB module 1464, a camera module 1465, a sensor module 1466, a GPS module 1467, a multi-vision module 1468, a moving image reproduction module 1469, an audio reproduction module 1470, a power supply module 1471, a touch screen module 1472, a user interface (UI) module 1473, an application module 1474, and/or any other suitable type of module which stores a program which performs a particular type of function.

Because a function of each of the modules may be inferred from the title thereof, only the multi-vision module 1468 will be described below. If a user disposes at least one other portable terminal (not shown) in proximity to the multi-vision controller 1400 and then performs a touch input on each of the at least one other portable terminal and the multi-vision controller 1400, the controller 1450 determines the disposition of the portable terminals based on touch input information received from the at least one other portable terminal via the mobile communication unit 1401 or sub-communication unit 1402 and touch input information received via the touch screen 1418, by operating the multi-vision module 1468. In addition, the multi-vision module 1468 includes commands which cause the controller 1450 to determine respective content portions to be displayed by each of the portable terminals constituting the multi-vision system by referring to device information of the at least one other portable terminal, and which cause the controller 1450 to generate content division information based on a result of the determination and then transmit the generated content division information to each of the portable terminals.

The above-described exemplary embodiments can be written as computer programs and can be implemented in general-use digital computers that execute the programs by using a transitory or non-transitory computer readable recording medium.

Examples of the computer readable recording medium include magnetic storage media (e.g., ROM, floppy disks, hard disks, etc.), optical recording media (e.g., CD-ROMs, or DVDs), and/or any other suitable computer readable recording medium.

While the present inventive concept has been particularly shown and described with reference to exemplary embodiments thereof, it will be understood by those of ordinary skill in the art that various changes in form and details may be made therein without departing from the spirit and scope of the exemplary embodiments as defined by the following claims. Accordingly, the disclosed exemplary embodiments should be considered in an illustrative sense rather than a limiting sense. The scope of the present inventive concept is defined not by the detailed description of the exemplary embodiments but by the appended claims, and all differences within the scope will be construed as being included in the present inventive concept.

What is claimed is:

1. A method for controlling a plurality of portable terminals, which plurality constitutes a multi-vision system, by using a multi-vision controller, the method comprising:
   receiving touch information to constitute the multi-vision system using the plurality of portable terminals from at least one of the plurality of portable terminals;
   determining a spatial arrangement of the plurality of portable terminals based on the received touch information in a state in which respective tracks by the each of touches are connected with each other; and
   generating picture division information which indicates respective content portions to be displayed by each of the plurality of portable terminals based on the determined spatial arrangement.

2. The method of claim 1, further comprising receiving information relating to respective resolutions and respective screen sizes of each of the plurality of portable terminals,
   wherein the generating of the picture division information is performed by referring to the received information relating to the respective resolutions and the respective screen sizes of each of the plurality of portable terminals.

3. The method of claim 1, wherein the touch information comprises dragging inputs, and the determining of the spatial arrangement comprises calculating respective relative locations of each of the plurality of portable terminals in a state in which respective tracks generated by the dragging inputs are connected with each other.

4. The method of claim 3, further comprising receiving information relating to respective bezel widths of each of the plurality of portable terminals,
   wherein the calculating of the respective relative locations comprises calculating, by using the information relating to the respective bezel widths, the respective relative locations of each of the plurality of portable terminals in the state in which the respective tracks are connected with each other.

5. The method of claim 3, wherein the touch information comprises information that indicates a start time and an end time of a touch gesture and a start location and an end location of the touch gesture.

6. The method of claim 1, further comprising transmitting the generated picture division information to each of the plurality of portable terminals.

7. The method of claim 1, wherein, if a touch on a first portable terminal is received on a right side of a screen of the first portable terminal with respect to a center of the screen of the first portable terminal and a touch on a second portable terminal is received on a left side of a screen of the second portable terminal with respect to a center of the screen of the second portable terminal, the generating picture division information comprises determining that the first portable terminal displays a first portion of two portions into which a whole picture is divided, and that the second portable terminal displays a second portion of the two portions.

8. The method of claim 7, further comprising transmitting the generated picture division information to each of the plurality of portable terminals,
   wherein the picture division information is generated based on an assumption that each of the first portable terminal and the second portable terminal has a same respective resolution and a same respective size.

9. The method of claim 1, further comprising starting a setting mode for implementing the multi-vision system by using the plurality of portable terminals,
   wherein the receiving of the touch information is performed in the setting mode.

10. The method of claim 9, wherein the starting of the setting mode is performed by receiving, from a user, input for selecting a predetermined application installed in the multi-vision controller.

11. A multi-vision controller comprising:
    a memory in which at least one program is stored; and
    a processor which sets a multi-vision system which includes a plurality of portable terminals by executing the at least one program;
    wherein the at least one program comprises commands which cause the multi-vision system to:
    receive touch information to constitute the multi-vision system using the plurality of portable terminals from at least one of the plurality of portable terminals;
    determine a spatial arrangement of the plurality of portable terminals based on the received touch information in a state in which respective tracks by the each of touches are connected with each other; and
    generate picture division information which indicates respective content portions to be displayed by each of the plurality of portable terminals based on the determined spatial arrangement.

12. The multi-vision controller of claim 11, wherein the at least one program further comprises commands which cause the multi-vision system to receive information relating to respective resolutions and respective screen sizes of each of the plurality of portable terminals, wherein the generating of the picture division information is performed by referring to the received information relating to the respective resolutions and the respective screen sizes of each of the plurality of portable terminals.

13. The multi-vision controller of claim 11, wherein the touch information comprises dragging inputs, and the determining of the spatial arrangement comprises calculating respective relative locations of each of the plurality of portable terminals in a state in which respective tracks generated by the dragging inputs are connected with each other.

14. The multi-vision controller of claim 13, wherein the at least one program further comprises commands which cause the multi-vision system to receive information relating to respective bezel widths of each of the plurality of portable terminals,
wherein the calculating of the respective relative locations comprises calculating, by using the information relating to the respective bezel widths, the respective relative locations of each of the plurality of portable terminals in the state in which the respective tracks are connected with each other.

15. The multi-vision controller of claim 13, wherein the touch information comprises information that indicates a start time and an end time of a touch gesture and a start location and an end location of the touch gesture.

16. The multi-vision controller of claim 11, wherein the at least one program further comprises commands which cause the multi-vision system to transmit the generated picture division information to each of the plurality of portable terminals.

17. The multi-vision controller of claim 11, wherein, if a touch on a first portable terminal is received on a right side of a screen of the first portable terminal with respect to a center of the screen of the first portable terminal and a touch on a second portable terminal is received on a left side of a screen of the second portable terminal with respect to a center of the screen of the second portable terminal, the generating picture division information comprises determining that the first portable terminal displays a first portion of two portions into which a whole picture is divided, and that the second portable terminal displays a second portion of the two portions.

18. The multi-vision controller of claim 17, wherein the at least one program further comprises commands which cause the multi-vision system to transmit the generated picture division information to each of the plurality of portable terminals,
wherein the picture division information is generated based on an assumption that each of the first portable terminal and the second portable terminal has a same respective resolution and a same respective size.

19. The multi-vision controller of claim 11, wherein the at least one program further comprises commands which cause the multi-vision system to start a setting mode for implementing the multi-vision system by using the plurality of portable terminals,
wherein the receiving of the touch information is performed in the setting mode.

20. The multi-vision controller of claim 19, wherein the commands which cause the multi-vision system to start the setting mode are executed in response to received user input for selecting a predetermined application installed in the multi-vision controller.

21. A non-transitory computer readable recording medium having recorded thereon a program for executing a method for controlling a plurality of portable terminals, which plurality constitutes a multi-vision system, by using a multi-vision controller, the method comprising:
receiving touch information to constitute the multi-vision system using the plurality of portable terminals from at least one of the plurality of portable terminals;
determining a spatial arrangement of the plurality of portable terminals based on the received touch information in a state in which respective tracks by the each of touches are connected with each other; and
generating picture division information which indicates respective content portions to be displayed by each of the plurality of portable terminals based on the determined spatial arrangement.

22. The computer readable recording medium of claim 21, wherein the method further comprises receiving information relating to respective resolutions and respective screen sizes of each of the plurality of portable terminals,
wherein the generating of the picture division information is performed by referring to the received information relating to the respective resolutions and the respective screen sizes of each of the plurality of portable terminals.

23. The computer readable recording medium of claim 21, wherein the touch information comprises dragging inputs, and the determining of the spatial arrangement comprises calculating respective relative locations of each of the plurality of portable terminals in a state in which respective tracks generated by the dragging inputs are connected with each other.

24. The computer readable recording medium of claim 23, wherein the method further comprises receiving information relating to respective bezel widths of each of the plurality of portable terminals, and wherein the calculating of the respective relative locations comprises calculating, by using the information relating to the respective bezel widths, the respective relative locations of each of the plurality of portable terminals in the state in which the respective tracks are connected with each other.

* * * * *